April 7, 1953     J. J. CAMPODONICO     2,633,753
TRANSMISSION
Filed April 16, 1951
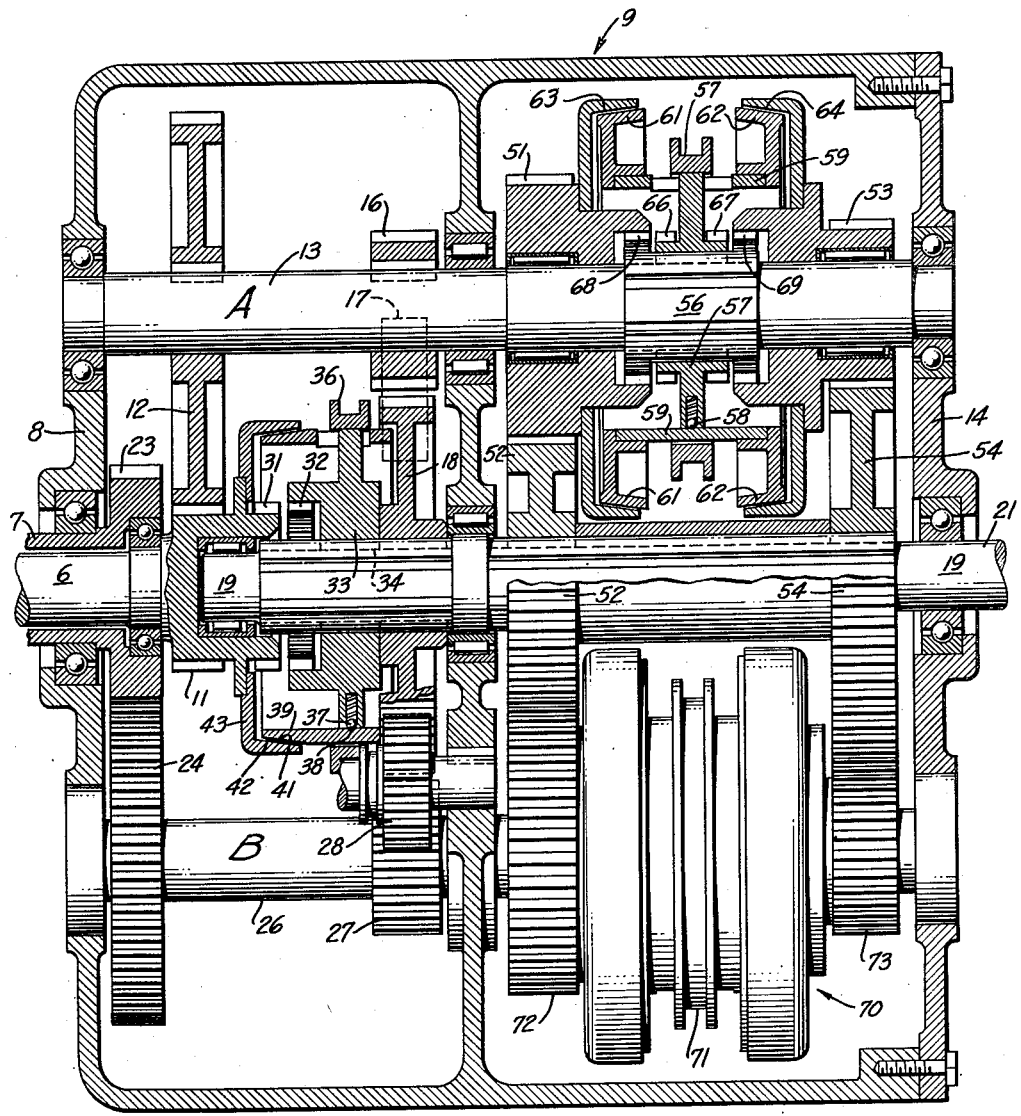
INVENTOR.
JOHN J. CAMPODONICO
BY

Patented Apr. 7, 1953

2,633,753

UNITED STATES PATENT OFFICE 2,633,753

TRANSMISSION

John J. Campodonico, Stockton, Calif., assignor, by direct and mesne assignments, of seventeen and one-half per cent to himself, seventeen and one-half per cent to Frank G. Campodonico, seventeen and one-half per cent to Edward E. Breitenbucher, seventeen and one-half per cent to James E. Guillet, fifteen per cent to John J. Ferraiuolo, and fifteen per cent to John T. McNally, Stockton, Calif.

Application April 16, 1951, Serial No. 221,216

1 Claim. (Cl. 74—330)

My invention relates to change speed transmissions primarily for use in automotive vehicles and particularly for use in trucks, tractors and other heavy duty service. Transmissions of this general character are represented by the patent to Campodonico, Number 2,386,540 issued October 9, 1945.

In general, vehicular transmissions with speed changes in steps are difficult to operate to provide a quick shift and to afford a positive and virtually instantaneous transfer of power in successive ratios.

It is therefore an object of my invention to provide a transmission in which a ratio shift can be accomplished very quickly.

Another object of the invention is to provide a change gear transmission in which delays due to gear clashing and failure to mesh are completely eliminated.

Another object of my invention is to provide an improved change gear or change speed transmission.

A still further object of the invention is to provide a change speed transmission substantially of the conventional sort in most respects in order that it will be readily serviceable and readily fabricated yet one in which numerous advantages in connection with the changing of gear ratios are obtained.

A still further object of the invention is to provide a gear change transmission having a large number of ratios in a comparatively normal sized unit utilizing two or more parallel shafts for mounting two or more synchronizing devices to preselect speeds in one gear while under power in another speed without loss of motion.

A still further object of the invention is to provide a multiple gear transmission instantaneously selective by the vehicle operator over the entire range.

Other objects, together with the foregoing, are attained in the form of the transmission illustrated in the accompanying drawing and described in the accompanying description.

In the drawing, the figure is a cross section on an approximately horizontal plane through a transmission constructed substantially in accordance with my invention, reference being had again to the issued patent hereinabove mentioned for further illustration and description of parts that are used in common.

In the preferred embodiment of the device, which has satisfactorily performed in service, the transmission is designed to receive power from an engine equipped with a dual clutch (not shown), that is, a clutch having two driven plates alternately engageable. One of the clutch plates when engaged drives a central drive shaft 6 while the other clutch plate when engaged drives a central drive sleeve 7. The shaft and the sleeve are both suitably mounted in the forward wall 8 of a transmission housing 9 of the usual construction for installation normally amidships in a vehicle. The drive shaft 6 on its inner end is equipped with a pinion gear 11 meshing with a driven gear 12 mounted at the forward end of an A shaft 13 journalled at its opposite ends in the front wall 8 and in the rear wall 14 of the housing 9.

Also mounted on the A shaft 13 is a first reverse pinion 16 designed to mesh with a shiftable reverse idler 17 (dotted). The idler is always in mesh with the pinion 16 and when axially shifted engages with the gear 18. This gear 18 is mounted on a central driven shaft 19 in axial alignment with the driving shaft 6 and the driving sleeve 7. The shaft 19 extends through the rear wall 14 of the transmission case to provide a junction 21 with a propellor shaft. With this arrangement, when the reverse idler 17 is slid into mesh with the gear 18, the drive is transmitted indirectly through the A shaft from the driving shaft 6 to the driven shaft 19.

In order to obtain a different reverse ratio and in effect to provide two reverse speeds, the driving sleeve 7 on its inner end is provided with a driving gear 23 meshing with a driven gear 24 on a B shaft 26. This latter shaft is supported in suitable bearings in the front wall 8 and in the rear wall 14 of the case 9 and is in all respects comparable to the shaft 13. Correspondingly, it has a driving pinion 27 fast on it meshing always with a reverse pinion 28 slidable into engagement with the driven gear 18 on the driven shaft 19. When the sliding gear 28 is engaged with its mating gear 18 and when the appropriate clutch plate is engaged to drive the sleeve 7, the torque of the sleeve is transmitted through such gears to the driven shaft 19. Thus, by appropriately engaging one or the other of the clutch plates when both of the reverse pinions are in mesh with their associated gears, it is possible to drive the driven shaft 19 at either selected one of two distinct reverse ratios.

Means are provided for directly coupling the driven shaft 19 and the driving shaft 6 to afford a direct drive, the fifth speed in the transmission shown. The inner end of the driving shaft 6 carries a central gear 31 designed to be overridden and engaged by a corresponding internal gear 32 on a sliding hub 33 mounted by splines 34 on the driven shaft 19. The hub 33 is forked and is moved by a shifting collar 36 actuated by a suitable fork arrangement (not shown) in the usual fashion. In the present instance the hub 33 likewise is radially drilled to carry spring pressed detents 37 at appropriate intervals. The detents engage radial depressions 38 in an encompassing cuff 39 fitting around the hub forks and coaxially mounted with respect to the driven shaft. The forward end of the cuff is slightly bevelled to form a clutch cone 41 engageable with a similar internal clutch cone 42 around the inner periphery of a drum 43 fastened to the driving shaft 6.

In the disengaged position of the shifting collar 36, the gears 31 and 32 are out of mesh and are disconnected so that no torque is transmitted from the drive shaft 6 to the driven shaft 19. However, when the operator shifts the collar 36 to the left, as seen in the figure, or in an engaging direction, the first effect of the axial movement of the hub 33 is to carry the cuff 39 axially along with it due to the engagement of the detents 37 with the interior of the cuff.

After a slight initial movement, the external cone 41 frictionally engages the internal cone 42 and causes the drive shaft very quickly to assume the same speed of rotation as the driven shaft 19. During this time, the main clutch on the shaft 6 is disengaged and the driving torque is transmitted through the sleeve 7. The two shafts 6 and 19 are therefore synchronized readily and without difficulty. Further movement of the shifting collar 36, since the clutch faces are then in firm abutment, causes the detents 37 to yield and the hub 33 to proceed in the axial direction far enough so that the internal gear 32 overrides and engages with the external gear 31. This locks the driving shaft 6 and the driven shaft 19 firmly together for straight through or "high" drive. With a reverse sequence of operation, the gears 32 and 31 are disengaged and as a final movement, the clutch cone 41 is withdrawn from the cone 42 so that the detent 37 reengages in the depression 38 and the shifting collar 36 and its attendant mechanism are restored to the initial position shown.

By the foregoing means, two choices of reverse speed are accomplished by shifting the master clutches when the direct drive is uncoupled. A direct drive is provided between the drive shaft 6 and the driven shaft 19 when they are clutched together by operation of the shifting collar 36. A shift between direct drive and the reverse on the B shaft is always possible simply by operating the main clutches on the shaft 6 and the sleeve 7, but it is not possible to shift from direct drive to the reverse on the A shaft.

In order to afford additional forward ratios, I provide on the A shaft 13 a freely revolving gear 51 always in mesh with a gear 52 splined on the driven shaft 19. Similarly, there is freely revolvable on the A shaft 13 another driving gear 53 permanently in mesh with a driven gear 54 splined on the driven shaft 19.

Either one or the other of the gears 51 and 53 may be coupled selectively to the A shaft 13 whenever the direct drive is disengaged. For that reason, the A shaft is provided with a splined central portion 56 on which a driving collar 57 is mounted. The collar carries a detent 58 in engagement with a cuff 59 coaxial with the A shaft and at its opposite ends carrying internal clutch cones 61 and 62. A suitable external clutch cone 63 is fastened to the gear 51 while a similar external clutch cone 64 is fastened to the gear 53.

When either one or the other of the gears 51 and 53 is to be driven, the central shifting collar 57 is operated in an appropriate direction. Its first effect is to move the cuff 59 either to the left or to the right and to engage either the internal cone 61 with the external cone 63, to secure synchronization appropriately between the gear 51 and the A shaft 13 or to shift the cone 62 into engagement with the cone 64 similarly to secure synchronization of the A shaft 13 with the gear 53. The synchronization of the A shaft 13 with either gears 51 or 53 is thus accomplished smoothly and quickly by means of the provided synchro-mesh device, the impetus coming from the driven shaft 19, as the master clutch for the shaft 6 is disengaged during this time.

As soon as synchronization has been achieved, further movement of the shifting collar 57 due to the abutment of the cone members causes the detent 58 to ride out of its initial engagement with the cuff 59 and causes either one of a pair of external gears 66 and 67 to slide into and mesh with corresponding internal gears 68 and 69 on the gears 51 and 53 respectively. This affords a locked connection between the A shaft 13 and the selected one of the gears so that when the main clutches on the shaft 6 and sleeve 7 are appropriately operated, the torque is then transmitted from the drive shaft 6 through the A shaft and either one of the gears 51 or 53 and the corresponding gear 52 or 54 to the driven shaft 19. In either direction of shift, a synchronization of the gears takes place before an actual engagement of the final drive so that there is no clashing and so that a firm and virtually instantaneous engagement is assured.

Similarly, the B shaft 26 is provided with an exactly comparable synchronizing unit 70 effective in precisely the same way to couple the B shaft to a driving gear 72 or to a driving gear 73. The driving gear 72 is continuously in mesh with the driven gear 52 while the driving gear 73 is continuously in mesh with the driven gear 54. A shift collar 71 therefore produces exactly the same general kind of effect as does the shift collar 57 but has, as a result, the coupling of the driving sleeve 7 and the B shaft either through the gear 72 and the gear 52 to the shaft 19 or through the gear 73 and the gear 54 to the shaft 19.

The synchro-mesh mechanism 70 uses the torque of the shaft 19 to bring the shaft 26 and the sleeve 7 up to speed to effectuate a synchronized shift between the B shaft and the driven shaft 19 whenever the driving sleeve 7 is not clutched to the engine, the synchronizing torque being derived from the driven shaft 19.

With this arrangement, the driver operating the vehicle has one of the master clutches engaged but the other one disengaged when he is proceeding in any one gear. The particular shaft A or B controlled by the disengaged clutch is not rotated when it is in neutral condition whereas the gears which run freely on that shaft are always rotated because they are meshed with the gears 52 and 54 which turn with the driven shaft 19. Even though one of the shafts A or B is declutched and is in neutral condition and is normally stationary, the driver can, as a preparatory measure, effectuate a shift on either A or B declutched shaft. During such shift, the synchro-mesh mechanism brings the previously stationary shaft up to an appropriate speed with the driven shaft so that a firm meshing or locking of the drive gears can be effectuated.

Subsequently, when the appropriate master clutch is disengaged and the other master clutch is engaged, the drive is then transmitted through the other shaft A or B on which the shift was accomplished when the shaft was idle by the synchronized engagement of the drive gears thereon. The disengaged one of the shafts A or B slows down and stops, thus avoiding wear, providing its drive gears are shifted to a neutral position. Otherwise, the shaft revolves idly as driven from the driven shaft 19 and the still engaged driving gears. But since the master clutch is disengaged, the drive is not locked but is ready for a quick shift back to the previous speed.

The gears, such as 51 and 53 or 72 and 73, freely mounted, always rotate whenever the vehicle moves since they are driven from the driven shaft 19 even though the engine is uncoupled.

Whenever the drive is to be direct, the shifting collar 36 provides an appropriate synchronization between the driving shaft 9 and the driven shaft 19 just prior to the synchronized meshing of the gears 31 and 32.

The arrangement is such that when direct drive is engaged, only speeds on the B shaft can be selected and is such that adjacent speeds on the A shaft cannot be chosen. The choice between speeds on the A shaft and speeds on the B shaft must be alternately chosen as a safety measure. The following choices are possible.

In fifth (direct) speed, shift can be to fourth, second, or B shaft reverse.

In fourth speed, shift can be to fifth, third, first or A shaft reverse.

In third speed, shift can be to fourth, second, or B shaft reverse.

In second speed, shift can be to fifth, third, first or A shaft reverse.

In first speed, shift can be to fourth, second, or B shaft reverse.

In A shaft reverse, shift can be to fourth, second, or B shaft reverse.

In B shaft reverse, shift can be to fifth, third, first or A shaft reverse.

The reverse speeds can easily have the same or similar synchro-mesh or synchronizing arrangement built into them, especially when the transmission is designed for installation in tractors and tanks. When working with bulldozers on tractors, it is more important to preselect speeds at ease due to material handling and lack of momentum, whether empty or full; for example, in bulldozing, shifting from fifth speed to B shaft reverse permits forward and reverse movement at will when so engaged. This is also useful for tanks by preselection of any speed or speeds listed above, easily and instantaneously at all times. Shifting can be accomplished without stopping.

In trucks, the reverse shift is employed infrequently and is accomplished usually with the vehicle quite stationary so that synchronization is not usually of sufficient importance to justify the cost of the necessary mechanism.

In accordance with the foregoing, therefore, I have provided a transmission having an A shaft and a B shaft and designed to operate with master clutches and especially incorporating means for synchronizing the gears being shifted on the A or B shaft preparatory to engagement of the respective one of the master clutches so that the gear shifting, although positive and firm, is accomplished without loss of time and without any hesitancy or failure of engagement. Any speed range transmission can be provided, such as 7, 9, 11, 13, etc. speeds for all vehicles and such as 2, 4, 6, 8, 10, etc. for special tanks and tractors, the direct drive being then usually omitted. The advantage of my transmission over conventional transmissions is the ability of the operator to shift to a higher or lower speed, in the complete range, at any given speed without loss of motion, or momentum, and while in continuous driving power.

What is claimed is:

A transmission comprising a driving shaft, a driving sleeve coaxial therewith, an A countershaft driven by said driving shaft, a B countershaft driven by said driving sleeve, a driven shaft coaxial with said driving shaft, gears fast on said driven shaft, a first pair of gears freely rotatable on said A countershaft and permanently in mesh with said gears on said driven shaft, a second pair of gears freely rotatable on said B countershaft and permanently in mesh with said gears on said driven shaft, a first synchronizing mechanism mounted to rotate with said A countershaft and operable to engage either one of the gears driven by said driven shaft of said first pair of gears, a second synchronizing mechanism mounted to rotate with said B countershaft and operable to engage either one of the gears driven by said driven shaft of said second pair of gears, means for directly coupling together said driving shaft and said driven shaft, and a pair of clutches arranged to selectively couple said driving shaft or said driving sleeve to a source of power, whereby a gear on one of said countershafts may be clutched to its countershaft while the other countershaft, the driven shaft and said gear are being driven from said source of power.

JOHN J. CAMPODONICO.

REFERENCES CITED

The following references are of record in the file of this patent:

UNITED STATES PATENTS

| Number | Name | Date |
| --- | --- | --- |
| 2,206,409 | Kummich | July 2, 1940 |
| 2,356,522 | Kummich | Aug. 22, 1944 |
| 2,386,540 | Campodonico | Oct. 9, 1945 |
| 2,511,539 | Orr | June 13, 1950 |